United States Patent
Akihisa et al.

(10) Patent No.: US 7,422,004 B2
(45) Date of Patent: Sep. 9, 2008

(54) INTERNAL COMBUSTION ENGINE WITH VARIABLE COMPRESSION RATIO

(75) Inventors: Daisuke Akihisa, Susono (JP); Eiichi Kamiyama, Mishima (JP); Shigeo Kikori, deceased, late of Fukushima (JP); by Akio Kikori, legal representative, Fukushima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 273 days.

(21) Appl. No.: 11/266,429

(22) Filed: Nov. 4, 2005

(65) Prior Publication Data
US 2006/0070605 A1 Apr. 6, 2006

Related U.S. Application Data

(63) Continuation of application No. PCT/JP2005/001154, filed on Jan. 21, 2005.

(30) Foreign Application Priority Data

Jan. 21, 2004 (JP) ............................. 2004-013130
Feb. 18, 2004 (JP) ............................. 2004-041718

(51) Int. Cl.
*F02M 51/00* (2006.01)
*F02B 75/04* (2006.01)

(52) U.S. Cl. ............... 123/478; 123/568.21; 123/90.15; 123/316

(58) Field of Classification Search ............... 123/478, 123/48 R, 78 R, 78 E, 316, 90.15, 90.16, 123/568.21
See application file for complete search history.

(56) References Cited

U.S. PATENT DOCUMENTS

| 6,125,801 | A | 10/2000 | Mendler |
| 6,631,708 | B1* | 10/2003 | Russell et al. ............... 123/685 |
| 6,994,061 | B2* | 2/2006 | Magner et al. ........... 123/90.15 |
| 7,278,383 | B2* | 10/2007 | Kamiyama et al. ........ 123/48 C |
| 2003/0111067 | A1 | 6/2003 | Russell et al. |

FOREIGN PATENT DOCUMENTS

| EP | 1 437 495 A2 | 7/2004 |
| JP | A-60-230522 | 11/1985 |
| JP | A-60-230548 | 11/1985 |
| JP | A-63-018142 | 1/1988 |
| JP | A-64-045965 | 2/1989 |
| JP | A 1-92538 | 4/1989 |

(Continued)

*Primary Examiner*—Willis R. Wolfe, Jr.
*Assistant Examiner*—Johnny H. Hoang
(74) *Attorney, Agent, or Firm*—Oliff & Berridge, PLC

(57) ABSTRACT

In a variable compression ratio internal combustion engine in which the compression ratio is changed by changing the combustion chamber volume, the present invention enables to inhibit irregularities in the air-fuel ratio involved by changing of the combustion chamber volume. In a transition period during which the compression ratio is changed, the actual volume of the combustion chamber realized by a compression ratio changing mechanism is detected. A factor that influences the air-fuel ratio (for example, fuel injection quantity, cylinder intake air quantity or amount of EGR) is controlled based on the actual volume of the combustion chamber thus detected to make the air-fuel ratio substantially equal to that before and after the change of the compression ratio.

14 Claims, 12 Drawing Sheets

FOREIGN PATENT DOCUMENTS

| | | |
|---|---|---|
| JP | A 1-104929 | 4/1989 |
| JP | A-01-106958 | 4/1989 |
| JP | A-02-040056 | 2/1990 |
| JP | A-05-133270 | 5/1993 |
| JP | A-05-302542 | 11/1993 |
| JP | A 8-86236 | 4/1996 |
| JP | Y2-2510247 | 6/1996 |
| JP | A 10-9005 | 1/1998 |
| JP | A 2000-513788 | 10/2000 |
| JP | A-2002-339737 | 11/2002 |
| JP | A 2003-193872 | 7/2003 |
| WO | WO 97/13063 A1 | 4/1997 |
| WO | WO 99/42718 | 8/1999 |

\* cited by examiner (a)

(b)

(c)

INTERNAL COMBUSTION ENGINE WITH VARIABLE COMPRESSION RATIO

This is a continuation application of Application PCT/JP2005/001154, filed Jan. 21, 2005.

TECHNICAL FIELD

The present invention relates to an internal combustion engine in which the compression ratio is varied by changing the combustion chamber volume.

BACKGROUND ART

Heretofore, a compression ratio changing mechanism for changing the compression ratio (or the mechanical compression ratio), defined as the ratio of the volume of the cylinder (cylinder volume) and the combustion chamber volume, by changing the combustion chamber volume mechanically has been known, as disclosed in, for example, Japanese Patent Application Laid-Open No. 60-230522. In internal combustion engines equipped with a compression ratio changing mechanism, it is possible to achieve an increase in the output power and gas mileage and prevention of knocking with a high degree of balance by changing the compression ratio in accordance with operating states.

Japanese Patent Application Laid-Open No. 1-106958 discloses a technology of controlling, in an internal combustion engine a variable compression ratio equipped with a plurality of cylinders, ignition time or fuel supply quantity in each of the cylinders based on the pressure in the cylinder at a time when combustion is not performed.

Japanese Patent Application Laid-Open No. 1-45965, Japanese Registered Utility Model No. 2510247 and Japanese Patent Application Laid-Open No. 2-40056 disclose methods of controlling ignition timing etc. when the compression ratio is changed.

Japanese Patent Application Laid-Open No. 63-18142 and Japanese Domestic Re-publication of PCT International Application No. 97-13063 discloses technologies of reducing the effective compression ratio in an internal combustion engine having a variable valve actuation mechanism and a compression ratio changing mechanism by controlling the variable valve actuation mechanism when knocking is detected.

DISCLOSURE OF THE INVENTION

In internal engines with a variable compression ratio, the combustion chamber volume is increased in achieving a low compression ratio and decreased in achieving a high compression ratio by, for example, relatively moving the cylinder block and the crank case or by bending the connecting rod to change the piston stroke length.

In the transition period during which the compression ratio is changed, the effective piston stroke length relative to the cylinder (i.e. the piston stroke length measured with the cylinder head being the reference) is different from that in the time during which the compression ratio is constant.

When the piston stroke length relative to the cylinder changes, the speed of the piston relative to the cylinder also changes. Specifically, when the piston stroke length relative to the cylinder is shortened, the speed of the piston relative to the cylinder decreases, and when the piston stroke length relative to the cylinder is lengthened, the speed of the piston relative to the cylinder increases.

Therefore, in internal combustion engines with a variable compression ratio, in the transition period during which the compression ratio is changed, the piston stroke length relative to the cylinder and the speed of the piston relative to the cylinder are different from those in the period during which the compression ratio is kept constant. Accordingly, in the cylinder that is on the intake stroke in the transition period during which the compression ratio is changed, the intake air quantity (which will be referred to as the in-cylinder intake air quantity hereinafter) is different from that in the period during which the compression ratio is kept constant, even if engine operating states such as the engine load and the engine speed are the same.

The fuel injection quantity of the internal combustion engine is determined in accordance with engine operating states, such as the engine load and the engine speed, so as to make the air-fuel ratio in the exhaust gas suitable for exhaust gas purification by exhaust gas purifying catalyst. In other words, the fuel injection quantity of the internal combustion engine is controlled in such a way that the air-fuel ratio of the air-fuel mixture becomes a target air-fuel ratio.

When a certain quantity of fuel that is determined in accordance with engine operating states such as the engine load and the engine speed is injected into the cylinder that is on the intake stroke in the transition period during which the compression ratio is changed, the air-fuel ratio of the air-fuel mixture sometimes deviates from the target air-fuel ratio. If the air-fuel ratio of the air-fuel mixture deviates from the target air-fuel ratio, the air-fuel ratio in the exhaust gas also deviates from the air-fuel ratio that is suitable for exhaust gas purification by exhaust gas purifying catalyst. Consequently, the exhaust gas purifying capacity of the exhaust gas purifying catalyst sometimes may be deteriorated, and exhaust gas characteristics may be deteriorated.

On the other hand, in the cylinder that is on the exhaust stroke in the transition period during which the compression ratio is changed, if the combustion chamber volume is increased in order to decrease the compression ratio, an increase in the residual amount of burnt gas in the cylinder will result.

In the case where the combustion chamber volume is increased, if the residual volume of the burnt gas increased only by the amount equal to the increase in the combustion chamber volume, there would be no change in fresh air intake characteristics. However, the residual burnt gas expands within the cylinder, and therefore the actual increase in the residual volume of the burnt gas is larger than the increase in the combustion chamber volume. Thus, the fresh intake air quantity decreases by an amount corresponding to the increase in the residual volume of the burnt gas minus the increase in the combustion chamber volume.

In contrast, in the case where the combustion chamber volume is decreased, there is a possibility that the decrease in the residual volume of the burnt gas is larger than the decrease in the combustion chamber volume. When the decrease in the residual volume of the burnt gas exceeds the decrease in the combustion chamber volume, the fresh intake air quantity increases by the amount corresponding to the exceeding volume.

In the transition period during which the combustion chamber volume is changed, irregularities in the air-fuel ratio tend to become particularly high since adjustment of the fuel injection quantity by a feedback control based on the exhaust gas air-fuel ratio cannot keep pace with changes in the intake characteristics. This leads to an increase in the possibility of deterioration in exhaust gas improving abilities and a decrease in gas mileage.

An object of the present invention is to provide a technology of inhibiting, in an internal combustion engine equipped with a compression ratio changing mechanism for changing the compression ratio by changing the combustion chamber volume, irregularities in the air-fuel ratio involved by changes in the combustion chamber volume.

To achieve the above object, according to the present invention, the following means is adopted. A characterizing feature of the present invention resides in that in an internal combustion engine equipped with a compression ratio changing mechanism that changes the compression ratio by changing the volume of a combustion engine, a factor that influences the air-fuel ratio is controlled in such a way that the air-fuel ratio of the air-fuel mixture in a cylinder in a transition period during which the compression ratio is changed becomes substantially equal to that before and after the change of the compression ratio.

For example, an internal combustion engine with a variable compression ratio according to the present invention has exhaust gas purifying catalyst provided in an exhaust passage, wherein the compression ratio is changed by changing the combustion chamber volume, and in a transition period during which the compression ratio is changed, the fuel injection quantity is corrected in such a way that the air-fuel ratio of the air-fuel mixture in a cylinder becomes substantially equal to that before and after the change of the compression ratio.

According to the present invention, in the transition period during which the compression ratio is changed, the fuel injection quantity is corrected in such a way that the air-fuel ratio of the air-fuel mixture becomes substantially equal to that before and after the change of the compression ratio. In other words, according to the present invention, the fuel injection quantity is corrected in accordance with a change in the in-cylinder intake air quantity caused by the change of the compression ratio.

Thus, according to the present invention, in the transition period during which the compression ratio is changed, it is possible to make the exhaust gas air-fuel ratio substantially equal to the exhaust gas air-fuel ratio before and after the change of the compression ratio. Accordingly, the exhaust gas air-fuel ratio is maintained at an air-fuel ratio suitable for exhaust gas purification in the exhaust gas purifying catalyst, whereby deterioration of exhaust gas characteristics in the transition period during, which the compression ratio is changed can be prevented.

According the present invention, in a transition period during which the compression ratio is changed to a high compression ratio, correction to decrease the fuel injection quantity as compared to that in the period during which the compression ratio is kept constant may be effected.

In the cylinder that is on the intake stroke in the transition period during which the compression ratio is changed to a high compression ratio, the stroke length of the piston relative to the cylinder becomes shorter than that in the period during which the compression ratio is kept constant and the speed of the piston relative to the cylinder decreases. This causes a decrease in the in-cylinder intake air quantity.

In such a case, by effecting the correction to decrease the fuel injection quantity as compared to that in the period during which the compression ratio is kept constant, the air-fuel ratio of the air-fuel mixture in the cylinder becomes substantially equal to that before and after the change of the compression ratio.

Therefore, in the period during which the compression ratio is changed to a high compression ratio, it is possible to make the exhaust gas air-fuel ratio substantially equal to the exhaust gas air-fuel ratio before and after the changing of the compression ratio by effecting the correction to decrease the fuel injection quantity as compared to that in the period during which the compression ratio is kept constant.

According the present invention, in a transition period during which the compression ratio is changed to a low compression ratio, correction to increase the fuel injection quantity as compared to that in the period during which the compression ratio is kept constant may be executed.

In the cylinder that is on the intake stroke in the transition period during which the compression ratio is changed to a low compression ratio, the stroke length of the piston relative to the cylinder becomes longer than that in the period during which the compression ratio is kept constant and the speed of the piston relative to the cylinder increases. This causes an increase in the in-cylinder intake air quantity.

In such a case, by performing the correction to increase the fuel injection quantity as compared to that in the period during which the compression ratio is kept constant, the air-fuel ratio of the air-fuel mixture in the cylinder becomes substantially equal to that before and after the change of the compression ratio.

Therefore, in the period during which the compression ratio is changed to a low compression ratio, it is possible to make the exhaust gas air-fuel ratio substantially equal to the exhaust gas air-fuel ratio before and after the changing of the compression ratio by executing the correction to increase the fuel injection quantity as compared to that in the period during which the compression ratio is kept constant.

According to the present invention, the correction amount in correcting the fuel injection quantity may be determined in accordance with the amount of change in the compression ratio (in other words, the amount of change in the combustion chamber volume).

To achieve the aforementioned object, according to the present invention, the following means may be adopted. The present invention in a control apparatus for the internal combustion engine with variable compression ratio may be provided with a compression ratio changing mechanism for changing the compression ratio by changing the volume of a combustion chamber, combustion chamber volume detection apparatus for detecting the actual volume of the combustion chamber realized by said compression ratio changing mechanism, and control unit for controlling a factor that influences the air-fuel ratio based on said actual volume of the combustion chamber detected by said combustion chamber volume detection apparatus.

According to the present invention, even if fresh air intake characteristics change with a change in the combustion chamber volume, irregularities in the air-fuel ratio can be inhibited, since the factor that influences the air-fuel ratio is controlled based on the actual volume of the combustion chamber.

Said control unit may be adapted to control the fuel injection quantity based on said actual volume of the combustion chamber.

A change in the combustion chamber volume leads to a change in the fresh intake air quantity as well as a change in the residual gas amount. By controlling the fuel injection quantity based on the actual volume of the combustion chamber, it is possible to realize a fuel injection quantity matched with the fresh intake air quantity. Thus, irregularities in the air-fuel ratio are inhibited.

In the case where the internal combustion engine according to the present invention has a variable valve actuation mechanism for changing a valve opening characteristic of an intake valve and/or an exhaust valve, said control unit may be adapted to determine a target in-cylinder intake air quantity corresponding to a operating state of the internal combustion engine and to control the operation of said variable valve actuation mechanism based on the target in-cylinder intake air quantity and the actual volume of the combustion chamber.

By controlling the operation of the variable valve actuation mechanism based on the actual volume of the combustion chamber, it is possible to make the actual in-cylinder intake air quantity close to the target in-cylinder intake air quantity even if the fresh intake air quantity changes with a change in the combustion chamber volume. Thus, irregularities in the air-fuel ratio are inhibited.

In the case where the internal combustion engine according to the present invention has EGR mechanism for changing an amount of EGR, said control unit may be adapted to determine a target amount of EGR corresponding to a operating state of the internal combustion engine and to control the operation of the EGR mechanism based on the target amount of EGR and the actual volume of the combustion chamber.

When the combustion chamber volume changes, the residual gas amount or the amount of EGR changes. However, by controlling the operation of the EGR mechanism based on the actual volume of the combustion chamber, it is possible to make the actual amount of EGR close to the target amount of EGR. Thus, irregularities in the air-fuel ratio are inhibited.

The control unit controls the factor that influences the air-fuel ratio based on the actual volume of the combustion chamber detected by the combustion chamber volume detection apparatus while the compression ratio is changed by the compression ratio changing mechanism.

In the transition period during which the compression ratio is changed, irregularities in the air-fuel ratio tend to become particularly high since adjustment of the fuel injection quantity by a feedback control based on the air-fuel ratio in the exhaust gas cannot keep pace with changes in the intake characteristics. During such transitional operating, by controlling the factor that influences the air-fuel ratio based on the actual volume of the combustion chamber, irregularities in the air-fuel ratio are inhibited in spite of changes in air intake characteristics.

According to the present invention, irregularities in the air-fuel ratio are inhibited in the transitional period during which the compression ratio is changed. As a result, the air-fuel ratio of the exhaust gas can be maintained at an air-fuel ratio suitable for exhaust gas purification in the exhaust gas purification catalyst, whereby deterioration in exhaust gas characteristics during the transition period during which the compression ratio is changed can be prevented.

BRIEF DESCRIPTION OF THE DRAWINGS

FIG. 2(a) shows the stroke length of the piston relative to the cylinder in the case where the compression ratio is kept constant. FIG. 2(b) shows the stroke length of the piston relative to the cylinder in the period during which the compression ratio is changed to a high compression ratio. FIG. 2(c) shows the stroke length of the piston relative to the cylinder in the period during which the compression ratio is changed to a low compression ratio.

DESCRIPTION OF THE PREFERRED EMBODIMENT

In the following, specific embodiments of the present invention will be described with reference to the accompanying drawings.

First Embodiment

Firstly, the first embodiment of the present invention will be described with reference to FIGS. 1 to 4.

<Basic Structure of Internal Combustion Engine with Variable Compression Ratio>

Figure 1:
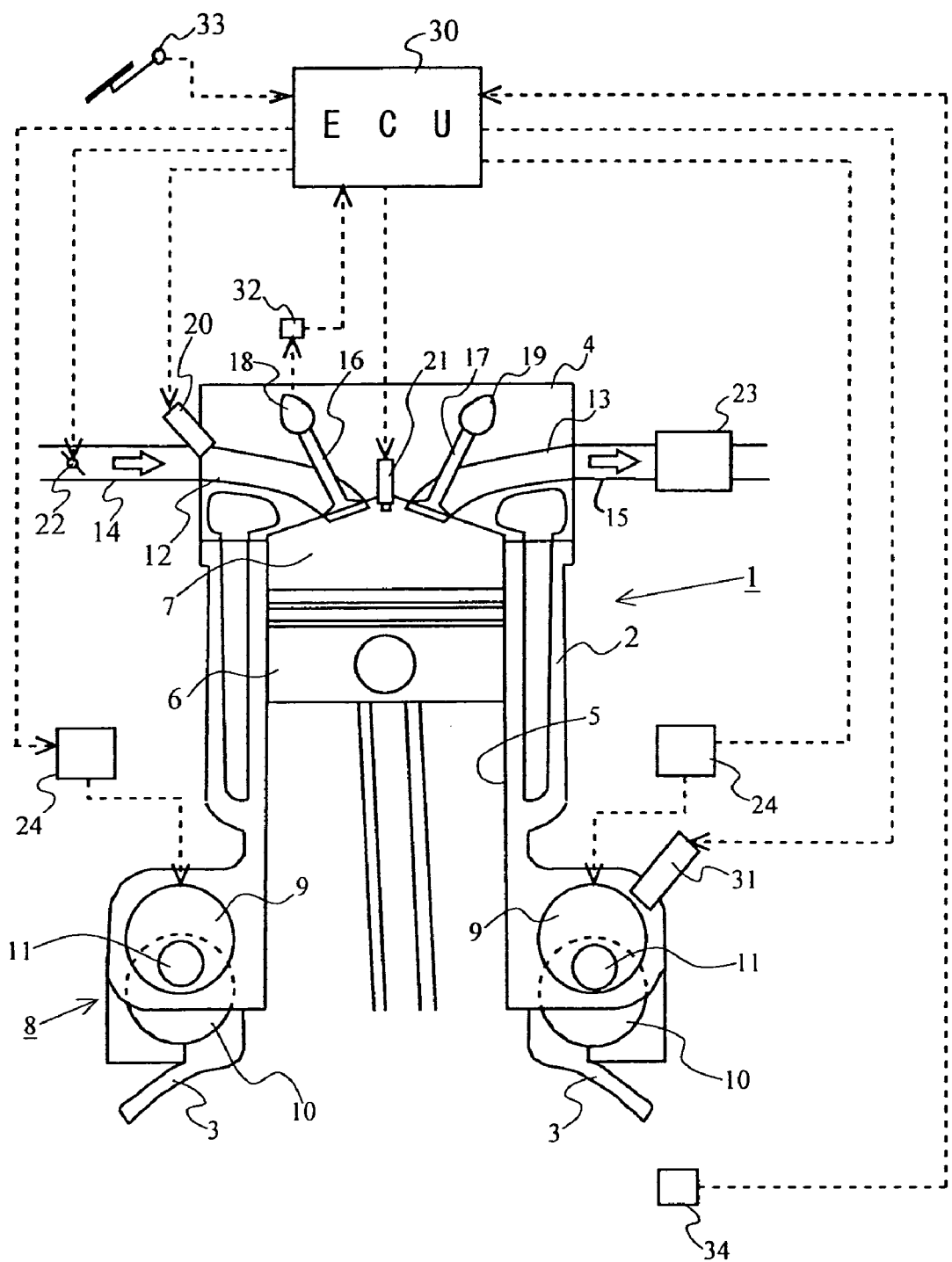
FIG. 1 schematically shows the structure of an internal combustion engine according to an embodiment of the present invention.

FIG. 1 schematically shows the structure of an internal combustion engine with a variable compression ratio according to this embodiment. The internal combustion engine with a variable compression ratio 1 is a multi-cylinder internal combustion engine, and FIG. 1 is a cross sectional view of one of the plurality of cylinders.

The internal combustion engine with a variable compression ratio 1 (which will be simply referred to as the internal combustion engine 1, hereinafter) is provided with a cylinder block 2 having cylinders 5, a cylinder head 4 provided on the upper portion of the cylinder block 2 and a crank case 3 to which a piston 6 is linked. The combustion chamber volume 7 is changed by moving the cylinder block 2 relative to the crank case 3 along the axial direction of the cylinder 5 by means of a compression ratio changing mechanism 8 to change the compression ratio.

The compression ratio changing mechanism 8 has the structure proposed in Japanese Patent Application Laid-Open No. 2003-206771. In this structure, the compression ratio is changed by changing the position of the cylinder block 2 relative to the crank case 3 along the axial direction of the cylinder 5, wherein a cam shaft is used as means for moving the cylinder block 2. The cam shaft is composed of a shaft portion 11, a cam portion 9 having a perfect circle cam profile fixed to the shaft portion 11 eccentrically to the central axis of the shaft portion 11, and a movable bearing portion 10 having the same outer profile as the cam portion 9 and rotatably attached to the shaft portion 11 in an eccentric manner. The cam portion 9 is rotatably attached to the cylinder block 2, and the movable bearing portion 10 is rotatably attached to the crank case 3. When the cam portion 9 is driven by the motor 24 to rotate, the distance between the axis of the cam portion 9 and the axis of the movable bearing portion 10 changes, so that the cylinder block 2 moves relative to the crank case 3.

The compression ratio changing mechanism 8 is adapted to change the position of the cylinder block 2 relative to the crank case 3 to change the reciprocation position of the piston 6 inside the cylinder 5. As a result, the volume of the space of the combustion chamber 7 at the time when the piston 6 is at the top dead center or the combustion chamber volume changes, though the stroke volume that is determined by the stroke of the piston 6 does not change. Thus, the compression ratio, i.e. the ratio of the combustion chamber volume and the volume of the cylinder (cylinder volume), is changed. The speed of changing the compression ratio is determined by the speed of the motor 24, and in some cases, it takes a certain length of time until completion of the change of the compression ratio.

In the cylinder head 4, there is provided an intake port 12 and an exhaust port 13 both of which are formed to open into the combustion chamber 7. The intake port 12 is connected with an intake pipe 14, in which a throttle valve 22 is provided. On the other hand, the exhaust port 13 is connected with an exhaust pipe 15, in which an exhaust gas purifying catalyst 23 is provided. The exhaust gas purifying catalyst 23 is, for example, a three way catalyst or a NOx storage reduction catalyst.

The openings of the intake port 12 and the exhaust port 12 at the combustion chamber 7 are respectively closed and opened by an intake valve 16 and an exhaust valve 17. The intake valve 16 and the exhaust valve 17 are driven by rotating an intake side cam 18 and an exhaust side cam 19 respectively. The intake side cam 18 and the exhaust side cam 19 are adapted to rotate while interlocked with each other.

A fuel injection valve 20 is disposed on the intake port 12. An ignition plug 21 for igniting the air-fuel mixture formed in the combustion chamber is disposed in the combustion chamber 7. Although not shown in the drawings, every cylinder has an intake port 12 formed in the cylinder head 4, and the end of the intake pipe 14 is divided into branches for respective cylinders and the branches are connected to the respective intake ports 12. The fuel injection valve 20 is provided on each branch of the intake pipe 14 for each cylinder so that fuel can be supplied on a cylinder by cylinder basis.

The internal combustion engine 1 is provide with various sensors such as a cam position sensor 31 adapted to output an electric signal indicative of the rotation angle of the cam shaft 11 of the compression ratio changing mechanism 8, an intake cam position sensor 32 adapted to output an electric signal indicative of the rotation angle of the intake side cam shaft 18, an accelerator position sensor 33 adapted to output an electric signal indicative of the accelerator position, and a crank position sensor 34 disposed in the crank case 3 and adapted to output an electric signal indicative of the rotation angle of a crankshaft to which the piston 6 is linked.

Furthermore, an electronic control unit (ECU) 30 for controlling the internal combustion engine 1 is annexed to the internal combustion engine 1. The ECU 30 is a unit for controlling the operating state of the internal combustion engine 1 in accordance with operating conditions of the internal combustion engine 1 and driver's demands. The ECU 30 is connected with various sensors such as the cam position sensor 31, the intake cam position sensor 32, the accelerator position sensor 33, and the crank position sensor 34 through electrical wires so that output signals of the sensors are input to the ECU 30. The ECU 30 is also electrically connected with the fuel injection valve 20, the ignition plug 21, the throttle valve 22, and the motor 24. Thus, the ECU 30 can control them.

One of the controls performed by the ECU 30 is a compression ratio control in which it drives the compression ratio changing mechanism 8 to change the mechanical compression ratio of the internal combustion engine 1. In this compression ratio control, operating states of the internal combustion engine 1 such as the accelerator position (the engine load) and the engine speed are firstly detected by the accelerator position sensor 33 and the crank position sensor 34, and then a target in-cylinder intake air quantity is computed using a map based on the detected operating states.

A target compression ratio is computed from a map which has as parameters the engine speed and the target in-cylinder intake air quantity, and the rotation amount of the motor 24 of the compression ratio changing mechanism 8 is controlled so that the actual compression ratio of the internal combustion engine 1 detected by the cam position sensor 31 becomes equal to the target compression ratio. How to set the target compression ratio in relation to the engine speed and the target in-cylinder intake air quantity is a matter of design, on which no particular limitations are placed. For example, it may be designed in the following way.

It is assumed that the internal combustion engine 1 according to this embodiment is a gasoline engine. In gasoline engines, the compression ratio is set relatively low in view of occurrence of knocking under high load. Accordingly, there is a margin for the compression ratio under partial load (particularly, under low load) in which knocking is unlikely to occur, namely, there is a margin for enhancing the output power and gas mileage by increasing the compression ratio.

In view of the above, in the compression ratio control using the compression ratio changing mechanism 8, a target compression ratio under high load is set as a reference target compression ratio, and a target compression ratio under partial load (under low load) is set higher than the reference target compression ratio. In other words, when the load is high, the target compression ratio is set low, and when the load is low, the target compression ratio is set high. By changing the target compression ratio in accordance with the engine load in this way, it is possible to realize both enhancement of the output power and gas mileage and prevention of knocking on a high level. The above-mentioned setting of the target compression ratio is merely an example, and other settings may also be used, needless to say.

To estimate the actual compression ratio, a sensor that detects the position of the cylinder block 2 relative to the crank case 3 may be used in place of the cam position sensor 31. When the motor 24 of the compression ratio changing mechanism 8 is a servo motor, the compression ratio may be computed based on a command value supplied to the motor 24.

In addition to the aforementioned compression ratio control, the ECU 30 also controls the fuel quantity (fuel injection quantity) injected through the fuel injection valve 20. In the stationary operating period during which the compression ratio is fixed, the ECU 30 determines the fuel injection quantity in accordance with engine operating states in a conventional manner, and performs a feedback control of the fuel injection quantity in every cycle for each of the cylinders in such a way that the exhaust gas air-fuel ratio detected by an exhaust gas air-fuel ratio sensor (not shown) becomes a target air-fuel ratio.

In the transition period during which the compression ratio is changed by the compression ratio changing mechanism 8, however, irregularities in the air-fuel ratio occur due to changes in the fresh air intake characteristics. In view of this, the ECU 30 is adapted to perform the following fuel injection control in the transition period during which the compression ratio is changed.

<Fuel Injection Quantity Control During Compression Ratio Changing Period>

Figure 2:
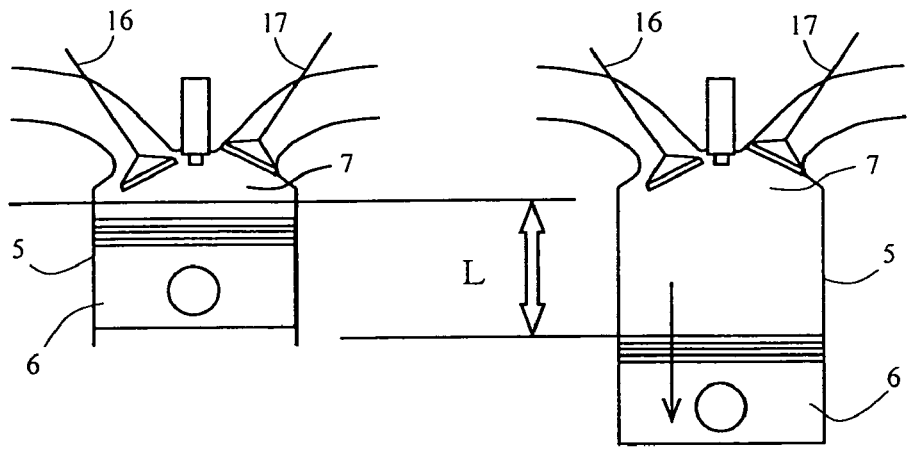
FIG. 2 shows the stroke length of a piston relative to a cylinder.
Figure 2:
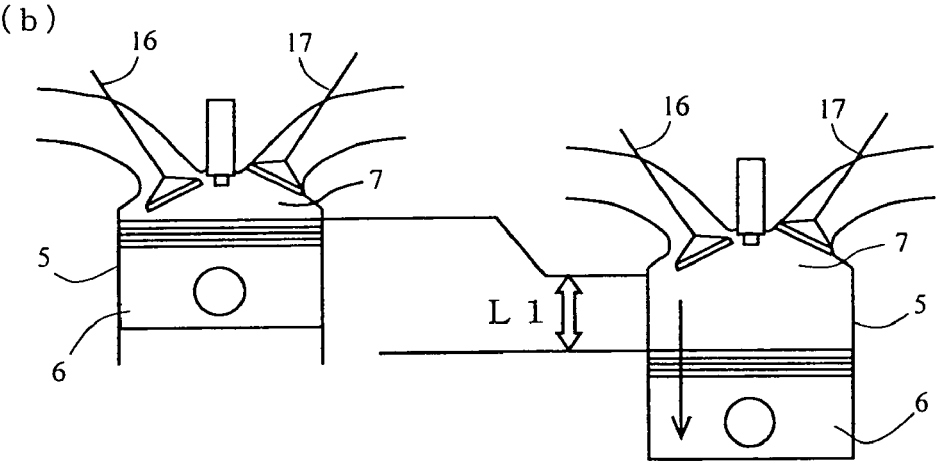
Figure 2:
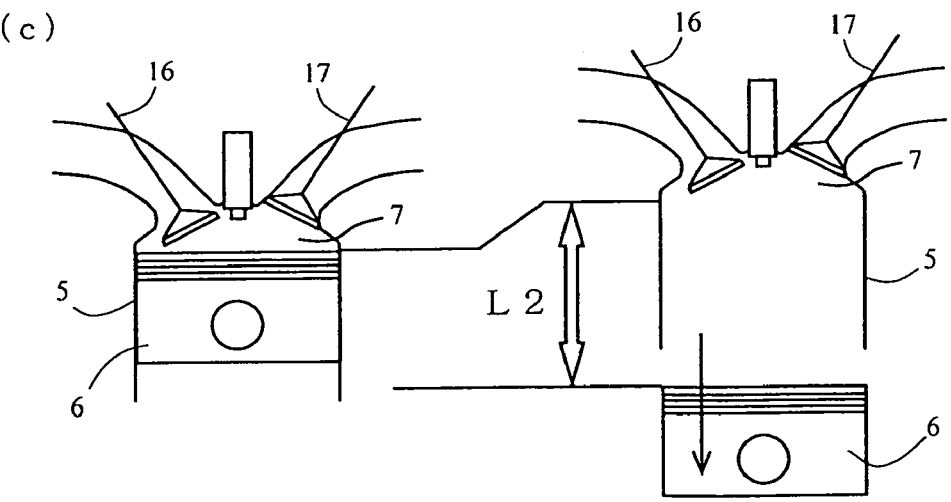

A fuel injection control, according to this embodiment, during the transition period during which the compression ratio is changed will be described with reference to FIGS. 2 to 4.

FIG. 2(a) indicates the stroke length L of the piston 6 relative to the cylinder 5 (or the cylinder head 4) in the period other than the transition period during which the compression ratio is changed, namely in the period the compression ratio is kept constant. FIG. 2(b) indicates the stroke length L1 of the piston 6 relative to the cylinder 5 in a transition period during which the compression ratio is changed to a high compression ratio. FIG. 2(c) indicates the stroke length L2 of the piston 6 relative to the cylinder 5 in a transition period during which the compression ratio is changed to a low compression ratio.

(Period of Transition to High Compression Ratio)

When the compression ratio is changed to a high compression ratio, the cylinder block 2 is moved closer to the crank case 3 (i.e. the combustion chamber volume is decreased) Accordingly, as shown in FIG. 2(b), the stroke length L1 of the piston 6 in the cylinder 5 in which the piston 6 is moving downwardly in the transition period during which the compression ratio is changed to a high compression ratio becomes shorter than the stroke length L in the period during which the compression ratio is kept constant. This leads to a decrease in the speed of the piston 6 relative to the cylinder 5.

Accordingly, the in-cylinder intake air quantity in the cylinder 5 that is on the intake stroke in the transition period during which the compression ratio is changed to a high compression ratio becomes smaller than that in the period during which the compression ratio is kept constant, even if operating states such as the engine load and the engine speed are the same.

Therefore, if fuel is injected during that period through the fuel injection valve 20 by an amount equal to the fuel quantity to be injected in the period during which the compression ratio is kept constant, there is a possibility that the air-fuel ratio of the air-fuel mixture in the aforementioned cylinder 5 will become lower than the target air-fuel ratio (i.e. the air-fuel mixture will become richer).

Figure 3:
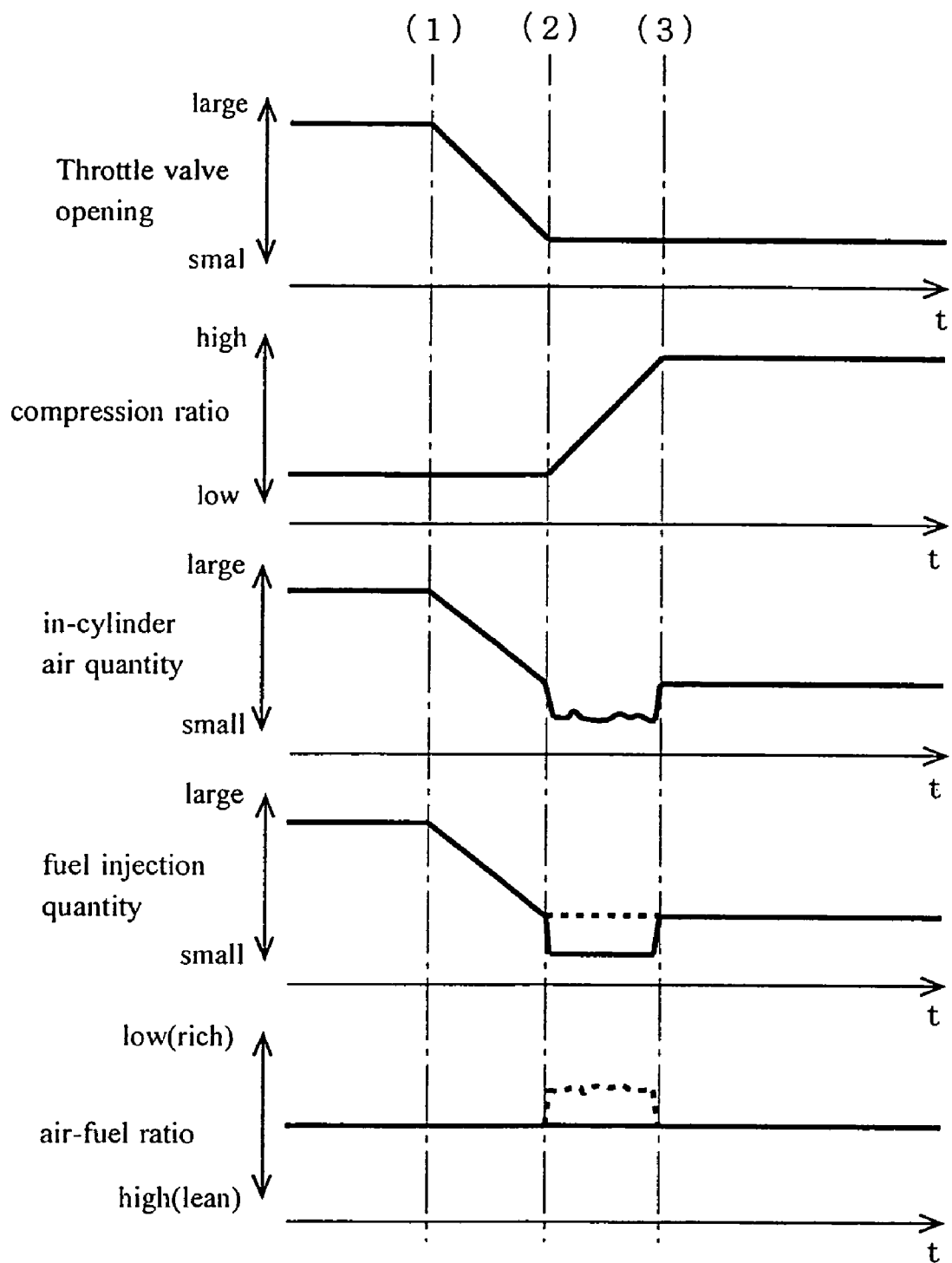
FIG. 3 is a time chart showing a relationship among the degree of opening of the throttle valve, the compression ratio, the in-cylinder intake air quantity, the fuel injection quantity and the air-fuel ratio of the air-fuel mixture, in the cylinder that is on the intake stroke upon transition from high load operating to low load operating.

In view of this, in this embodiment, as shown in FIG. 3, a correction is effected for the cylinder 5 that is on the intake stroke in the transition period during which the compression ratio is changed to a high compression ratio to decrease the fuel injection quantity injected through the fuel injection valve 20 as compared to that in the period during which the compression ratio is kept constant.

FIG. 3 is a time chart showing a relationship among the degree of opening of the throttle valve 22 upon transition from high load operating to low load operating, the compression ratio, the in-cylinder intake air quantity of the cylinder 5 that is on the intake stroke at that time, the fuel injection quantity in that cylinder 5, and the air-fuel ratio of the air-fuel mixture in that cylinder 5. In FIG. 3, the period until time (1) corresponds to high load operating, the period after time (2) corresponds to low load operating, and the period from time (1) to time (2) corresponds to transitional operating.

In transition from high load operating to low load operating, the degree of opening of the throttle valve 22 is decreased during the period from time (1) to time (2). Consequently, the in-cylinder intake air quantity is decreased. In this period, the fuel injection quantity is also reduced. In this embodiment, the compression ratio of the internal combustion engine 1 is kept at a low compression ratio until time (2).

When the degree of opening of the throttle valve 22 and the fuel injection quantity reach target values (or when the operating shifts to low load operating) at time (2), the compression ratio is changed to a high compression ratio over the period from time (2) to time (3). The in-cylinder intake air quantity during this transition period (i.e. the period from time (2) to time (3) in FIG. 3) becomes smaller than that in the period during which the compression ratio is kept constant, as described above.

Accordingly, the ECU 30 is adapted to reduce the fuel injection quantity in the period from time (2) to time (3) as indicated by the solid line in FIG. 3, as compared to that in the period during which the compression ratio is kept constant (indicated by the broken line in FIG. 3). The degree of this reduction is determined in accordance with the amount of change in the compression ratio in such a way that the air-fuel ratio of the air-fuel mixture becomes substantially equal to that before and after the change the compression ratio.

The ECU 30 determines the cylinder 5 that is on the intake stroke in the period from time (2) to time (3) based on the output values of the intake cam position sensor 32 and the crank position sensor 34.

As described before, if the correction to reduce the fuel injection quantity is not effected in the transition period (the period from time (2) to time (3) in FIG. 3) during which the compression ratio is changed to a high compression ratio, there is a possibility that the air-fuel ratio of the air-fuel mixture in that period will become lower than the air-fuel ratio in the time before and after the change of the compression ratio (i.e. the period during which the compression ratio is kept constant) (as indicated by the broken line in FIG. 3). In other words, there is a possibility that the air-fuel ratio of the air-fuel mixture in the transition period during which the compression ratio is changed to a high compression ratio may become lower than the target air-fuel ratio.

In contrast, when the ECU 30 effects the correction to reduce the fuel injection quantity in the aforementioned transition period, the air-fuel ratio in the aforementioned transition period can be kept substantially equal to that in the time before and after the change of the compression ratio as indicated by the solid line in FIG. 3. In other words, the air-fuel ratio of the air-fuel mixture can be kept equal to the target air-fuel ratio even in the aforementioned transitional period.

As per the above, according to this embodiment, in a variable compression ratio internal combustion engine, it is possible to maintain the air-fuel ratio of the exhaust gas at an air-fuel ratio suitable for exhaust gas purifying catalyst 23 even in the transition period during which the compression ratio is changed to a high compression ratio, to thereby prevent deterioration of exhaust gas characteristics.

(Period of Transition to Low Compression Ratio)

When the compression ratio is changed to a low compression ratio, the cylinder block 2 is moved away from the crank case 3 (i.e. the combustion chamber volume is increased). Accordingly, as shown in FIG. 2(*c*), the stroke length L2 of the piston 6 in the cylinder 5 in which the piston 6 is moving downwardly in the transition period during which the compression ratio is changed to a low compression ratio becomes longer than the stroke length L in the period during which the compression ratio is kept constant. This leads to an increase in the speed of the piston 6 relative to the cylinder 5.

Accordingly, the in-cylinder intake air quantity in the cylinder 5 that is on the intake stroke in the transition period during which the compression ratio is changed to a low compression ratio becomes larger than that in the period during which the compression ratio is kept constant, even if operating states such as the engine load and the engine speed are the same.

Therefore, if fuel is injected during that period through the fuel injection valve 20 by an amount equal to the fuel quantity to be injected in the period during which the compression ratio is kept constant, there is a possibility that the air-fuel ratio of the air-fuel mixture in the aforementioned cylinder 5 will become higher than the target air-fuel ratio (i.e. the air-fuel mixture will become leaner).

Figure 4:
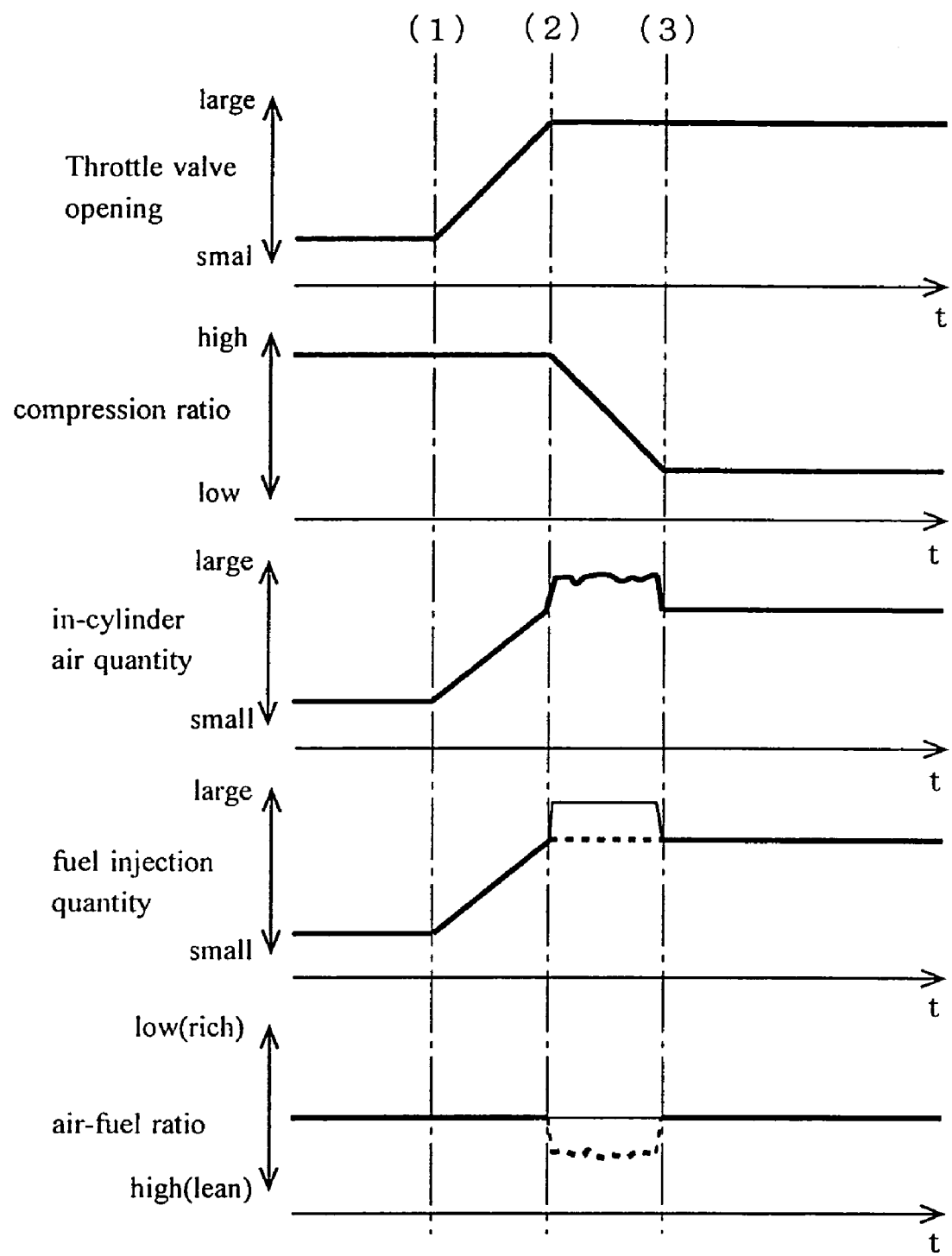
FIG. 4 is a time chart showing a relationship among the degree of opening of the throttle valve, the compression ratio, the in-cylinder intake air quantity, the fuel injection quantity and the air-fuel ratio of the air-fuel mixture, in the cylinder that is on the intake stroke upon transition from low load operating to high load operating.

In view of this, in this embodiment, as shown in FIG. 4, a correction is effected for the cylinder 5 that is on the intake stroke in the transition period during which the compression ratio is changed to a low compression ratio to increase the fuel injection quantity injected through the fuel injection valve 20 as compared to that in the period during which the compression ratio is kept constant.

FIG. 4 is a time chart showing a relationship among the degree of opening of the throttle valve 22 upon transition from low load operating to high load operating, the compression ratio, the in-cylinder intake air quantity of the cylinder 5 that is on the intake stroke at that time, the fuel injection quantity in that cylinder 5, and the air-fuel ratio of the air-fuel mixture in that cylinder 5. In FIG. 4, the period until time (1) corresponds to low load operating, the period after time (2) corresponds to high load operating, and the period from time (1) to time (2) corresponds to transitional operating.

In transition from high load operating to low load operating, the degree of opening of the throttle valve 22 is increased during the period from time (1) to time (2). Consequently, the in-cylinder intake air quantity is increased. In this period, the fuel injection quantity is also increased. In this embodiment, the compression ratio of the internal combustion engine 1 is kept at a high compression ratio until time (2).

When the degree of opening of the throttle valve 22 and the fuel injection quantity reach target values (or when the operating shifts to high load operating) at time (2), the compression ratio is changed to a low compression ratio over the period from time (2) to time (3). The in-cylinder intake air quantity during this transition period (i.e. the period from time (2) to time (3) in FIG. 4) becomes larger than that in the period during which the compression ratio is kept constant, as described above.

Accordingly, the ECU 30 is adapted to increase the fuel injection quantity in the period from time (2) to time (3) as indicated by the solid line in FIG. 4, as compared to that in the period during which the compression ratio is kept constant (indicated by the broken line in FIG. 4). The degree of this increase is determined in accordance with the amount of change in the compression ratio in such a way that the air-fuel ratio of the air-fuel mixture becomes substantially equal to that before and after the change of the compression ratio.

As described before, if the correction to increase the fuel injection quantity is not effected in the transition period (the period from time (2) to time (3) in FIG. 4) during which the compression ratio is changed to a low compression ratio, there is a possibility that the air-fuel ratio of the air-fuel mixture in that period will become higher than the air-fuel ratio in the time before and after the change of the compression ratio (i.e. the time during which the compression ratio is kept constant) (as indicated by the broken line in FIG. 4). In other words, there is a possibility that the air-fuel ratio of the air-fuel mixture in the transition period during which the compression ratio is changed to a low compression ratio may become higher than the target air-fuel ratio.

In contrast, when the ECU 30 effects the correction to increase the fuel injection quantity in the aforementioned transition period, the air-fuel ratio in the aforementioned transition period can be kept substantially equal to that in the time before and after the change of the compression ratio as indicated by the solid line in FIG. 4. In other words, the air-fuel ratio of the air-fuel mixture can be kept equal to the target air-fuel ratio even in the aforementioned transitional period.

As per the above, according to this embodiment, in a variable compression ratio internal combustion engine, it is possible to maintain the air-fuel ratio of the exhaust gas at an air-fuel ratio suitable for exhaust gas purifying catalyst 23 even in the transition period during which the compression ratio is changed to a low compression ratio, to thereby prevent deterioration of exhaust gas characteristics.

Although in this embodiment the compression ratio is changed to a high compression ratio or a low compression ratio after the engine load has shifted to low load or high load, the compression ratio may be changed during shifting of the engine load. In this case also, the correction of the fuel injection quantity should be effected simultaneously with changing of the compression ratio.

Second Embodiment

Next, an embodiment of a control apparatus of a variable compression ratio internal combustion engine according to the present invention will be described with reference to FIGS. 5 to 7. The Following description will be directed to structures that are different from those in the first embodiment, and description of the structures same as those in the first embodiment will be omitted.

The difference between this embodiment and the above-described first embodiment resides in that while in the above-described first embodiment the air-fuel ratio in the cylinder 5 that is on the intake stroke in the transition period during which the compression ratio is changed is optimized, in this embodiment the air-fuel ratio of the cylinder 5 that is on the exhaust stroke in the transition period during which the compression ratio is changed is mainly optimized.

An intake valve 16 and an exhaust valve 17 in this embodiment are adapted to be opened and closed by variable valve actuation mechanism 35 and 36 respectively. The variable valve actuation mechanisms 35, 36 may be a mechanical system like a cam mechanism or an electric system like an electromagnetic solenoid. In this embodiment, a variable valve actuation mechanism that can variably control the opening/closing timing by opening/closing the intake valve 16 by means of an electromagnetic solenoid 35*a* is used as the variable valve actuation mechanism 35 for the intake valve 16 in particular.

Between the intake pipe 14 and the exhaust pipe 15, there is provided an EGR apparatus 37 that recirculates a part of the burnt gas flowing through the exhaust pipe 15 to the intake pipe 14. The EGR apparatus 37 is adapted to lower the combustion temperature of air-fuel mixture by recirculating a part of the burnt gas to the combustion chamber 7, thereby reducing the amount of NOx generated by combustion of the air-fuel mixture.

The EGR apparatus 37 is composed of an EGR pipe 38 that connects the exhaust pipe 15 and the intake pipe 14 and an EGR valve 39 provided at a midpoint in the EGR pipe 38. The EGR valve 39 is means for controlling the quantity of the burnt gas (or EGR gas) recirculated to the intake pipe 14 through the EGR pipe 38. The EGR valve 39 is adapted to adjust the recirculation amount of the burnt gas by controlling the degree of opening or the open time of the valve.

The electromagnetic solenoid 35a of the variable valve actuation mechanism 35 and the EGR valve 39 are connected to the output side of the ECU 30.

In the cylinder 5 that is on the exhaust stroke in the transition period during which the compression ratio is changed, there are variations in the amount of the burnt gas remaining in that cylinder 5, and therefore there are variations in the in-cylinder intake air quantity in the subsequent intake stroke.

For example, in the cylinder 5 that is on the exhaust stroke in the transition period during which the compression ratio is changed to a high compression ratio, the residual amount of the burnt gas decreases with a decrease in the combustion chamber volume. This leads to an increase in the quantity of air introduced into the cylinder 5 (i.e. the in-cylinder intake air quantity) in the subsequent intake stroke.

On the other hand, in the cylinder 5 that is on the exhaust stroke in the transition period during which the compression ratio is changed to a low compression ratio, the residual amount of the burnt gas increases with an increase in the combustion chamber volume. This leads to a decrease in the in-cylinder intake air quantity in the subsequent intake stroke.

In the cylinder 5 that is on the exhaust stroke in the transition period during which the compression ratio is changed to a high compression ratio, the stroke length of the piston 6 increases, since the cylinder block 2 and the cylinder head 4 are lowered while the piston 6 moves upward. Consequently, the amount of the gas remaining in the cylinder 5 decreases, and the in-cylinder intake air quantity in the subsequent intake stroke increases accordingly.

On the other hand, in the cylinder 5 that is on the exhaust stroke in the transition period during which the compression ratio is changed to a low compression ratio, the stroke length of the piston 6 decreases, since the cylinder block 2 and the cylinder head 4 are lifted while the piston 6 moves upward. Consequently, the amount of the gas remaining in the cylinder 5 increases, and the in-cylinder intake air quantity in the subsequent intake stroke decreases accordingly.

Figure 6:
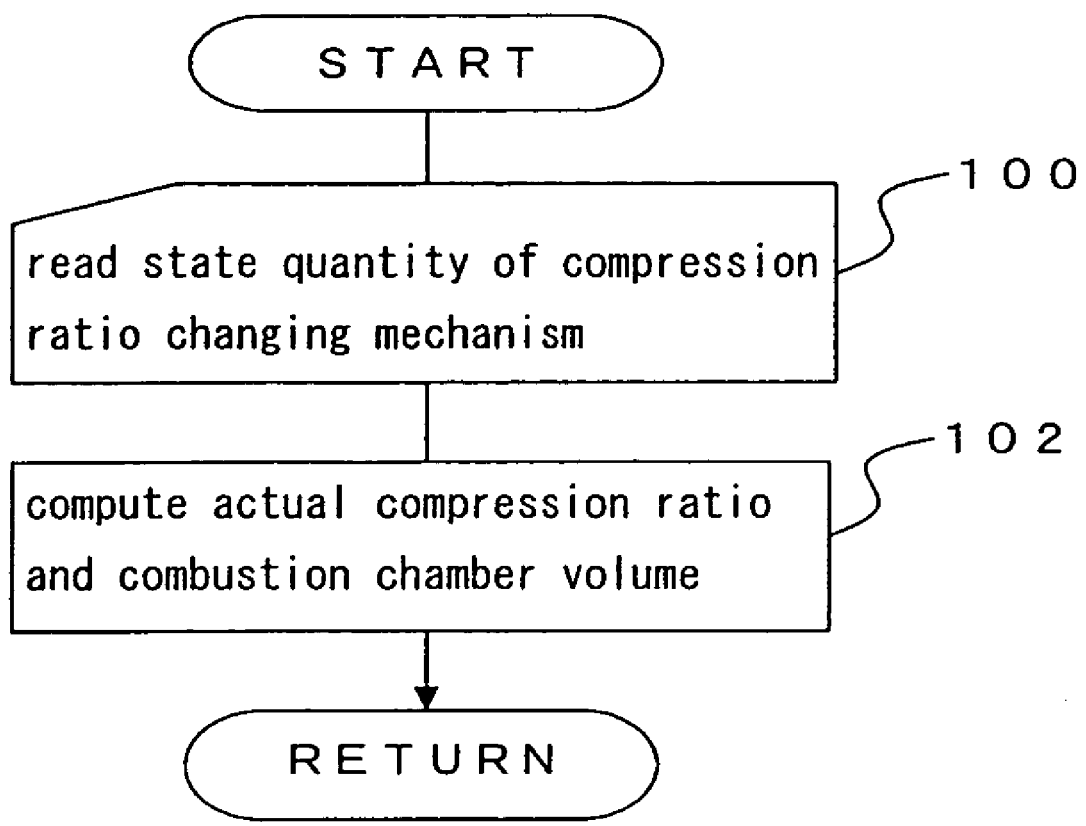
FIG. 6 is a flow chart of a combustion chamber volume computation routine executed in the first embodiment of the present invention.
Figure 7:
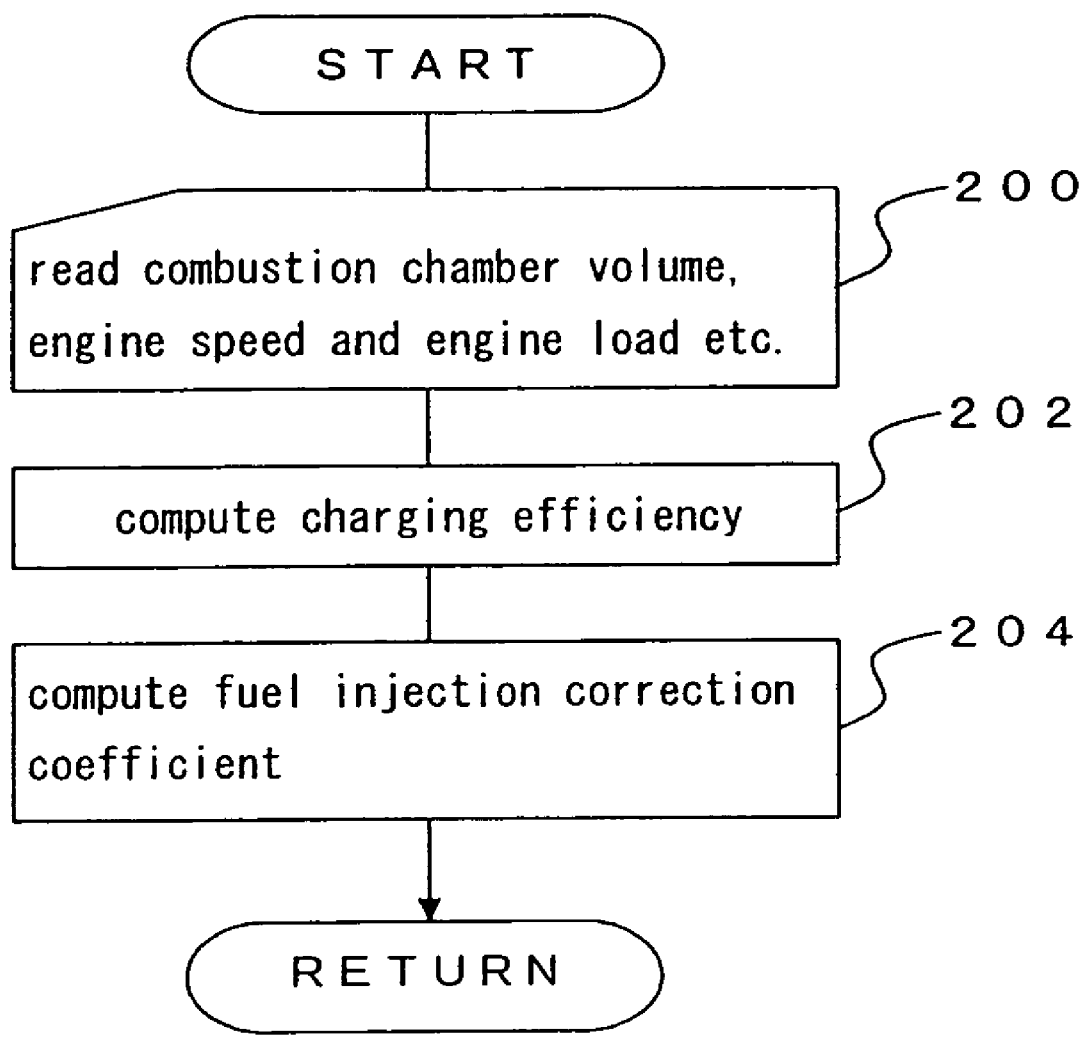
FIG. 7 is a flow chart of a fuel injection quantity computation routine executed in the first embodiment of the present invention.

The ECU 30 is adapted to effect correction of the fuel injection quantity against the above-described variations in the in-cylinder intake air quantity in accordance with the routine specified by flow charts of FIGS. 6 and 7.

In the routine shown in FIG. 6, the combustion chamber volume is computed. This routine is executed in every cycle for each of the cylinders. In this routine specifically, in first step 100, a quantity of state of the compression ratio changing mechanism 8 is read. Here, a detection value of the cam position sensor 31 is read as the quantity of state. In subsequent step 102, the actual compression ratio is computed based on the quantity of state read in step 100, and the actual volume of the combustion chamber 7 is further computed based on the actual compression ratio.

In the routine shown in FIG. 7, a correction amount of the fuel injection quantity (fuel injection quantity correction amount) is computed based on the actual volume of the combustion chamber. This routine is also executed in every cycle for each of the cylinders. In this routine specifically, in first step 200, information, such as the combustion chamber volume, the engine speed and the engine load, is read. The combustion chamber volume read here is that computed in step 102. The engine speed read here is that computed based on detection information of the crank position sensor 34. The engine load read here is that computed based on detection information of an intake air flow sensor (an air flow meter) that is not shown in the drawings and the engine speed.

In step 202, the charging efficiency of the cylinder 5 is computed based on the various kinds of information read in step 200. A tree-dimensional map using as parameters the combustion chamber volume, the engine speed and the engine load has been prepared, and the charging efficiency corresponding to the current values of these parameters can be computed from the map.

Referring to the tendency of the charging efficiency in relation to the parameters, at least as to the combustion chamber volume, it is set that the larger the combustion chamber volume is, the lower the charging efficiency becomes. This is because when the combustion chamber volume increases, the residual volume of the burnt gas in the cylinder 5 also increases by a larger amount, and the fresh intake air quantity decreases accordingly.

Next, in step 204, a fuel injection correction coefficient is computed based on the charging efficiency computed in step 202. The fuel injection correction coefficient may be computed using, for example, following formula (1) or formula (2).

$$\text{correction coefficient} = (\text{current value of charging efficiency})/(\text{last value of charging efficiency}) \quad (1)$$

$$\text{correction coefficient} = (\text{current value of charging efficiency})/(\text{reference value}) \quad (2)$$

In the above formula (1), "current value of charging efficiency" is the value of the charging efficiency computed in step 202 this time, and "last value of charging efficiency" is the value of the charging efficiency computed in the last cycle of the same cylinder. In the above formula (2), "reference value" is a variable that may change depending on the engine speed and the engine load and read from a map that has as parameters the engine speed and the engine load.

The ECU 30 multiplies a base fuel injection quantity by the correction coefficient computed by the above formula (1) or formula (2) and outputs the obtained value to the fuel injection valve 20 as a fuel injection quantity signal. The base fuel injection quantity may be computed from a map based on operating states of the internal combustion engine 1 or the fuel injection quantity obtained by feedback control of the exhaust gas air-fuel ratio. As will be understood from formula (1) and formula (2), the fuel injection quantity is corrected to be increased with an increase in the charging efficiency and decreased with a decrease in the charging efficiency.

Although both formula (1) and formula (2) are equations for determining a correction coefficient for the base fuel injection quantity, these formulas may be modified into equations for determining a corrected fuel quantity that is to be added to (or subtracted from) the base fuel injection quantity. Alternatively, the corrected fuel quantity may be computed from a map that has as a parameter the charging efficiency, without using any formula. Alternatively, the corrected fuel quantity may be directly computed from a three-dimensional map that has as parameters the combustion chamber volume, the engine speed and the engine load, instead of computing the charging efficiency.

With execution of the routine shown in FIG. 7, the fuel injection quantity is corrected in accordance with the change in the actual volume of the combustion chamber. Specifically, when the combustion chamber volume is increased in order to decrease the compression ratio, the fuel injection quantity is reduced in accordance with the decrease in the charging efficiency. On the other hand, when the combustion chamber volume is decreased in order to increase the compression ratio, the fuel injection quantity is increased in accordance with the increase in the charging efficiency. Thus, by controlling the fuel injection quantity based on the combustion chamber volume, it is possible to achieve a fuel injection quantity matched with the fresh intake air quantity.

Therefore, according to this embodiment, irregularities in the air-fuel ratio involved by changing of the combustion chamber volume is decreased, and deterioration in exhaust gas improving abilities and deterioration in gas mileage can be reduced.

In the above-described second embodiment, the "combustion chamber volume detection apparatus" of the present invention is realized by execution of the routine shown in FIG. 6 by the ECU 30, and the "control unit" of the present invention is realized by execution of the routine shown in FIG. 7.

Third Embodiment

In the following, the third embodiment of the present invention will be described with reference to FIGS. 8 and 9.

Figure 8:
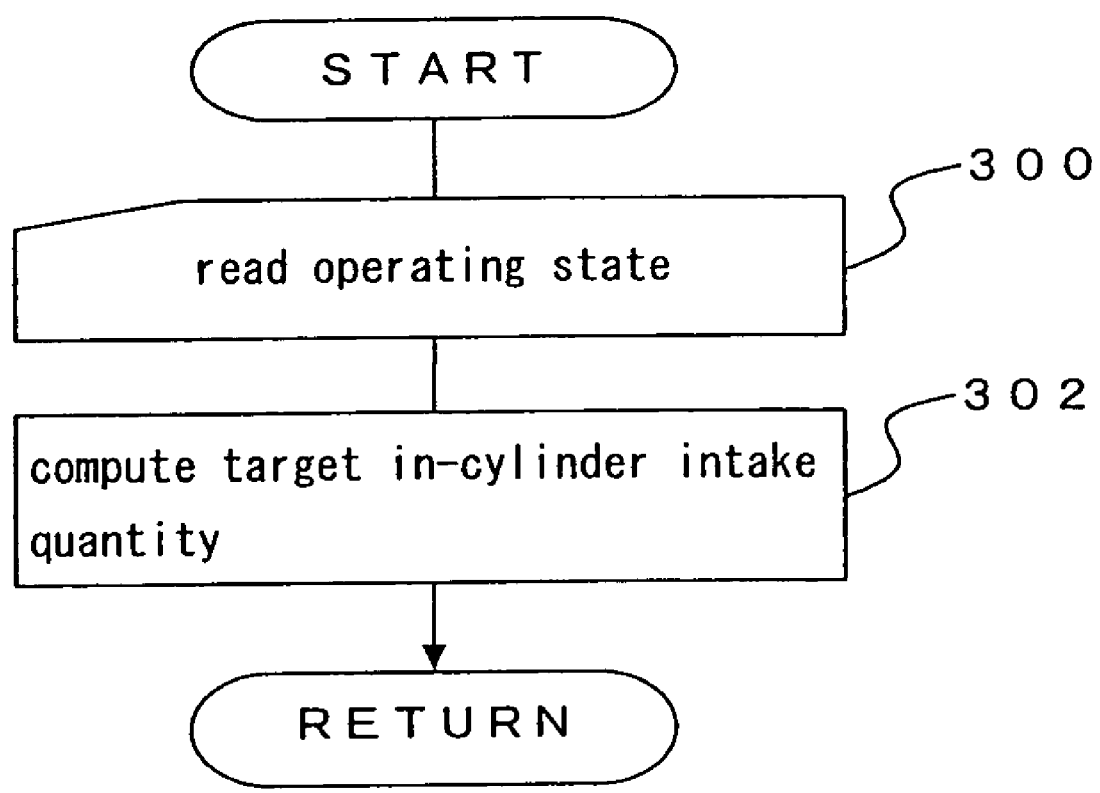
FIG. 8 is a flow chart of a target in-cylinder intake air quantity computation routine executed in a second embodiment of the present invention.
Figure 9:
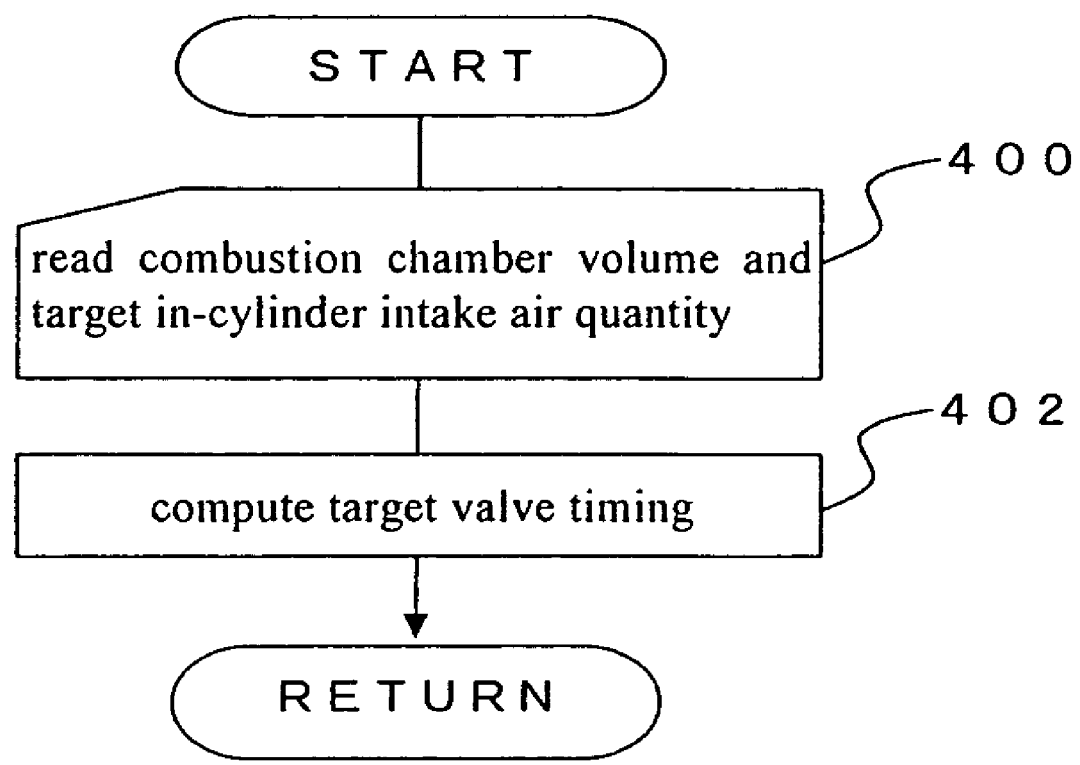
FIG. 9 is a flowchart of a target valve timing computation routine executed in the second embodiment of the present invention.

In this embodiment, the ECU 30 executes the routines shown in FIGS. 8 and 9 instead of the routine shown in FIG. 7 in the above-described second embodiment.

Irregularities in the air-fuel ratio involved by changing of the combustion chamber volume is caused by departure of the actual in-cylinder intake air quantity from the target in-cylinder intake air quantity due to changes in the residual amount of burnt gas. Although in the second embodiment, the irregularities in the air-fuel ratio is inhibited by correcting the fuel injection quantity based on the actual volume of the combustion chamber, it is possible to inhibit irregularities in the air-fuel ratio without correcting the fuel injection quantity if the actual in-cylinder intake air quantity can be made close to the target in-cylinder intake air quantity.

In this embodiment, the actual in-cylinder intake air quantity is made close to the target intake air quantity by variably controlling closing timing of the intake valve 16 using the variable valve actuation mechanism 35. In contrast to the compression ratio changing mechanism 8 that takes a certain time in changing the compression ratio, valve timing control by the variable valve actuation mechanism 35 has good responsiveness, and the in-cylinder intake air quantity can be adjusted in a moment. The routines shown in FIGS. 8 and 9 are routines for computing closing timing of the intake valve 16.

In the routine shown in FIG. 8, a target in-cylinder intake air quantity is computed. This routine is executed in every cycle for each of the cylinders. In stoichiometirically-operating gasoline engines, the output torque is determined by the air quantity, and therefore the target in-cylinder intake air quantity is substantially in direction relation to the target torque corresponding to operating states. Referring to the routine, specifically, in first step 300, the ECU 30 reads operating states of the internal combustion engine 1. Here, the operating states refer to information on the accelerator position and the engine speed etc. that is necessary in determining the target torque. In subsequent step 302, the ECU 30 computes a target in-cylinder intake air quantity using a map (not shown) based on the operating states read in step 300. In connection with this, in the case where a target in-cylinder intake air quantity has already been computed in order to set a target compression ratio, the target in-cylinder intake air quantity thus computed may be used.

In the routine shown in FIG. 9, a target valve timing of the intake valve 16 for realizing the target in-cylinder intake air quantity is computed. This routine is also executed in every cycle for each of the cylinders. The target valve timing mentioned here is the closing timing of the intake valve 16. The opening timing of the intake valve 16 is set to normal valve timing that is determined by operating states of the internal combustion engine 1. The in-cylinder intake air quantity can be increased by setting the closing timing of the intake valve 16 closer to the bottom dead center. When the closing timing is set in the advance angle side relative to the bottom dead center, the in-cylinder intake air quantity can be decreased by further advancing the closing timing. When the closing timing is set in the retard angle side relative to the bottom dead center, the in-cylinder intake air quantity can be decreased by further retarding the closing timing.

In the routine shown in FIG. 9, firstly in step 400, the ECU 30 reads information necessary in computing target valve timing. Here, the combustion chamber volume computed in the routine shown in FIG. 6 and the target in-cylinder intake air quantity computed in the routine shown in FIG. 8 are read.

In step 402, target valve timing of the intake valve 16 is computed based on the information read in step 400. The valve timing may be computed, for example, by a method of computing target valve timing for realizing the target in-cylinder intake air quantity using a physical model that is built taking into account an influence of the combustion chamber volume, or a method of computing a base value of the target valve timing based on the target in-cylinder intake air quantity and computing a correction value of the target valve timing from a map that uses as a parameter a change in the charging efficiency derived from the combustion chamber volume. In any case, the target valve timing is set in such a way that the smaller the combustion chamber volume is (i.e. the higher the compression ratio is), the more the intake air quantity is decreased. This is because the charging efficiency is higher when the combustion chamber volume is small than when the combustion chamber volume is large. If the valve timing in cases where the combustion chamber volume is small were the same as that in cases where the combustion chamber volume is large, an excessive quantity of air would be introduced beyond the target in-cylinder intake air quantity.

By executing the routine shown in FIG. 9, the closing timing of the intake valve 16 is adjusted in accordance with changes in the actual volume of the combustion chamber. Specifically, when the combustion chamber volume is increased to decrease the compression ratio, the closing timing of the intake valve 16 is adjusted in such a way as to increase the in-cylinder intake air quantity so as to compensate a decrease in the charging efficiency. On the other hand, when the combustion chamber volume is decreased to increase the compression ratio, the closing timing of the intake valve 16 is adjusted in such a way as to decrease the in-cylinder intake air quantity so as to compensate an increase in the charging efficiency. By controlling the closing timing of the intake valve 16 based on the actual volume of the combustion chamber, it is possible to make the actual in-cylinder intake air quantity close to the target in-cylinder intake air quantity.

As per the above, according to this embodiment, irregularities in the air-fuel ration involved by the change of the combustion chamber volume are inhibited, and deterioration in exhaust gas improving abilities and deterioration in gas mileage are reduced, as with the second embodiment. In addition, this embodiment realizes an additional effect of suppressing fluctuations of the torque by achieving the target in-cylinder intake air quantity.

In the above-described third embodiment, the "control unit" of the present invention is realized by execution of the routines shown in FIGS. 8 and 9 by the ECU 30.

Fourth Embodiment

In the following, the fourth embodiment of the present invention will be described with reference to FIGS. 10 and 11.

Figure 10:
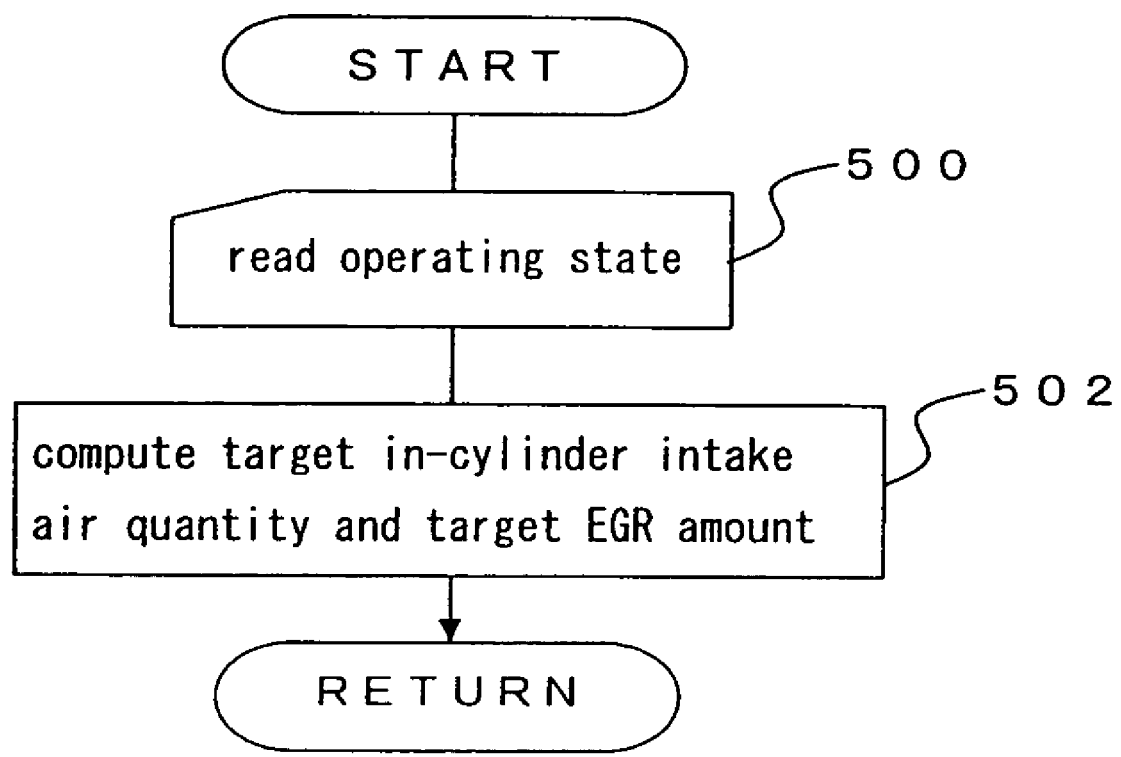
FIG. 10 is a flow chart of a target in-cylinder intake air quantity and target amount of EGR computation routine executed in a second embodiment of the present invention.
Figure 11:
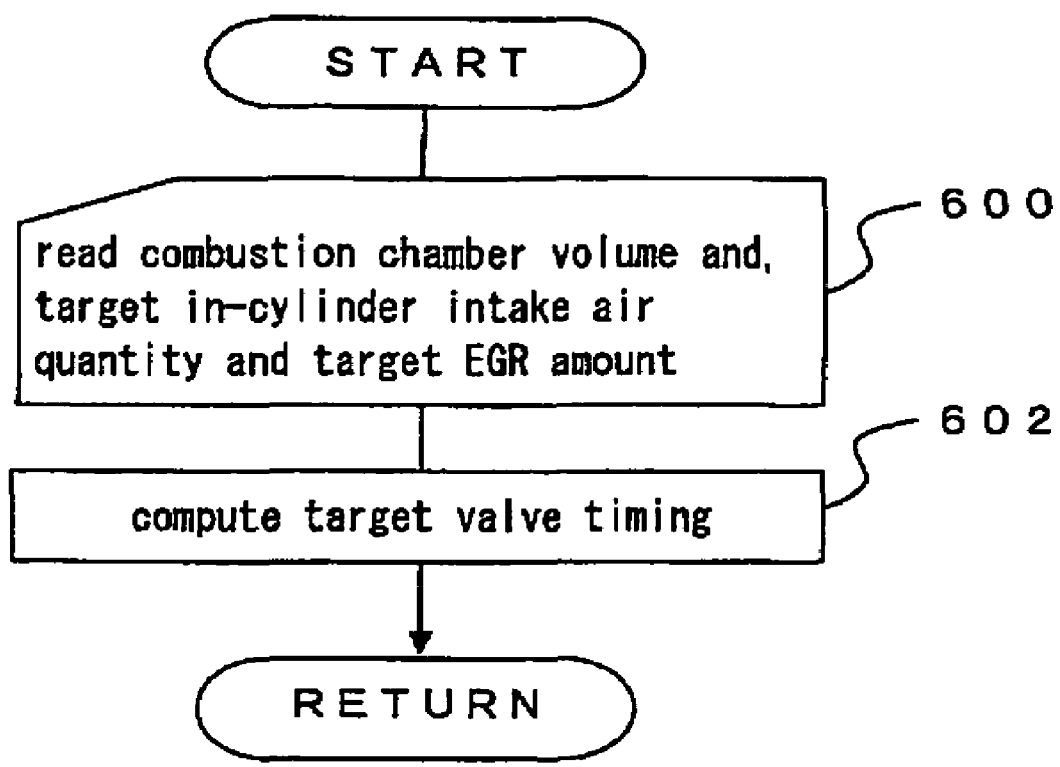
FIG. 11 is a flow chart of a target valve timing computation routine executed in a third embodiment of the present invention.

In this embodiment, the ECU 30 executes the routine shown in FIG. 10 instead of the routine shown in FIG. 8 in the third embodiment, and executes the routine shown in FIG. 11 instead of the routine shown in FIG. 9.

Although in the third embodiment, irregularities in the air-fuel ratio are inhibited by controlling the variable valve actuation mechanism 35 to positively make the in-cylinder intake air quantity close to a target in-cylinder intake air quantity, irregularities in the air-fuel ration may be inhibited by making the residual amount of the burnt gas in the cylinder 5 or the amount of EGR close to the a target amount of EGR corresponding to operating states of the internal combustion engine 1. The amount of EGR may be adjusted by, for example, variably controlling the opening timing of the intake valve 16. Changing of the opening timing of the intake valve 16 causes a change in the overlapping period of the intake valve 16 and the exhaust valve 17, whereby what is called an amount of internal EGR is adjusted.

In this embodiment, the ECU 30 variably controls the opening timing of the intake valve 16 by means of the variable valve actuation mechanism 35 to make the amount of EGR close to a target amount of EGR, and in addition, variably controls the closing timing of the intake valve 16 to make the actual in-cylinder intake air quantity close to a target intake air quantity in a similar manner as in the third embodiment. It is possible to adjust the closing timing and the opening timing of the intake valve 16 as desired by using the variable valve actuation mechanism 35 that uses an electromagnetic solenoid 35*a*.

The routines shown in FIGS. 10 and 11 are routines for computing the opening and closing timing of the intake valve 16. In the routine shown in FIG. 10, a target in-cylinder intake air quantity and a target amount of EGR are computed. This routine is executed in every cycle for each of the cylinders. In the routine shown in FIG. 10, firstly in step 500, the ECU 30 reads operating states of the internal combustion engine 1. Here, the operating states refer to information on the accelerator position and the engine speed etc. that is necessary in determining the target torque. In subsequent step 502, the ECU 30 computes a target in-cylinder intake air quantity and a target amount of EGR using a map (not shown) based on the operating states read in step 500.

In the routine shown in FIG. 11, target valve timing of the intake valve 16 for realizing the target in-cylinder intake air quantity and the target amount of EGR is computed. This routine is also executed in every cycle for each of the cylinders. Here, the target valve timing refers to both the opening timing and closing timing of the intake valve 16.

The amount of internal EGR can be increased by adjusting the opening timing of the intake valve 16 in such a way that the overlapping period of the intake valve 16 and the exhaust valve 17 is lengthened, and can be decreased by adjusting the opening timing of the intake valve 16 in such a way that the overlapping period of the intake valve 16 and the exhaust valve 17 is shortened.

On the other hand, the in-cylinder intake air quantity can be increased by setting the closing timing of the intake valve 16 closer to the bottom dead center. When the closing timing is set in the advance angle side relative to the bottom dead center, the in-cylinder intake air quantity can be decreased by further advancing the closing timing. When the closing timing is set in the retard angle side relative to the bottom dead center, the in-cylinder intake air quantity can be decreased by further retarding the closing timing.

In step 600, the ECU 30 reads information that is necessary in computing target valve timing. Here, the combustion chamber volume computed in the routine shown in FIG. 6, the target in-cylinder intake air quantity and the target amount of EGR computed in the routine shown in FIG. 10 are read.

In step 602, the ECU 30 computes, based on the information read in step 600, target valve timing of the intake valve 16, or opening timing of the intake valve 16 for realizing the target amount of EGR and closing timing of the intake valve 16 for realizing the target in-cylinder intake air quantity.

The target valve timing may be computed by, for example, a method of computing target valve timing for realizing the target in-cylinder intake air quantity and the target amount of EGR using a physical model that is built taking into account an influence of the combustion chamber volume. Alternatively, a method of computing a base value of the target valve timing based on the target in-cylinder intake air quantity, computing a correction value of the opening timing from a map using as a parameter a change in the charging efficiency derived from the combustion chamber volume, and computing a correction value of the closing timing from a map using as parameters a change in the charging efficiency and the target amount of EGR may be adopted. In any case, the closing timing is set in such a way that an amount of internal EGR corresponding to operating states of the internal combustion engine 1 is realized, and the opening timing is set in such a way that an in-cylinder intake air quantity corresponding to operating states of the internal combustion engine 1 is realized.

By executing the routine shown in FIG. 11, opening and closing timing of the intake valve 16 is adjusted in accordance with changes in the actual volume of the internal combustion engine. Specific setting of the opening timing of the intake valve 16 cannot be uniquely determined, since it relates to the design choice that how the amount of EGR should be set in relation to operating states of the internal combustion engine 1. For example, the opening timing of the intake valve 16 may be set in such a way that changes in the charging efficiency involved by changes in the combustion chamber volume is prevented. More specifically, when the combustion chamber volume is increased in order to decrease the compression ratio, the opening timing of the intake valve 16 may be adjusted in such a way as to decrease the amount of internal EGR so as to compensate the decrease in the charging efficiency. When the combustion chamber volume is decreased in order to increase the compression ratio, the opening timing of the intake valve 16 may be adjusted in such a way as to increase the amount of internal EGR so as to compensate the increase in the charging efficiency.

In this embodiment described above, by controlling the opening and closing timing of the intake valve 16 based on the actual volume of the combustion chamber, it is possible to make the in-cylinder intake air quantity and the amount of EGR close to respective target values. Thus, irregularities in the air-fuel ratio involved by changing of the combustion chamber volume are inhibited, and deterioration in exhaust gas improving abilities and gas mileage is also reduced.

In the above-described fourth embodiment, the variable valve actuation mechanism 35 constitutes the "EGR mechanism" of the present invention. In addition, the "control unit" of the present invention is realized by execution of the routines shown in FIGS. 10 and 11 by the ECU 30.

Fifth Embodiment

In the following, the fifth embodiment of the present invention will be described with reference to FIG. 12.

Figure 12:
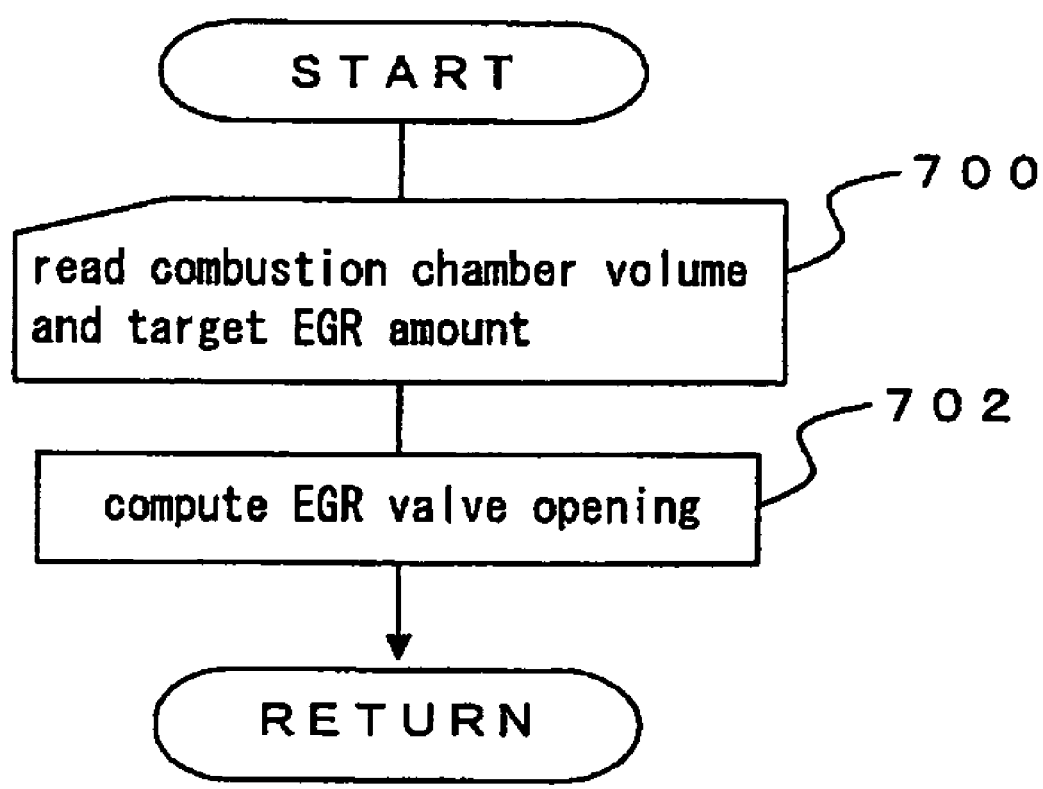
FIG. 12 is a flow chart of an EGR valve opening computation routine executed in a fourth embodiment of the present invention.

In this embodiment, the ECU 30 executes the routine shown in FIG. 12 instead of the routine shown in FIG. 11 in the above-described fourth embodiment.

Although in the above-described fourth embodiment, the amount of internal EGR is adjusted by variably controlling the opening timing of the intake valve 16, the recirculation amount of burnt gas from the exhaust pipe 15 to the intake pipe 14, namely the amount of external EGR, may be adjusted by controlling the EGR apparatus 37. In this embodiment, the ECU 30 changes the amount of external EGR by variably controlling the EGR valve 39 of the EGR apparatus 37 to make the total amount of EGR or the sum of the amount of external EGR and the internal EGR close to a target amount of EGR. The routine shown in FIG. 12 is a routine for computing the degree of opening of the EGR valve 39 of the EGR apparatus 37.

In the routine shown in FIG. 12, the degree of opening of the EGR valve 39 for realizing a target amount of EGR is computed. The amount of external EGR can be increased by increasing the degree of opening of the EGR valve 39, and can be decreased by decreasing the degree of opening of the EGR valve 39.

Firstly in step 700, the ECU 30 read information that is necessary in computing the degree of opening of the EGR valve 39. Here, the combustion chamber volume computed in the routine shown in FIG. 6 and the target amount of EGR computed in the routine shown in FIG. 10 are read. Incidentally, the target in-cylinder intake air quantity computed in the routine shown in FIG. 10 is not used in this embodiment.

In step 702, the ECU 30 computes the degree of opening of the EGR valve 39 based on the information read in step 700. The computation of the degree of opening of the EGR valve 39 can be effected by, for example, the following process.

Firstly, the change in the charging efficiency is computed based on the change in the combustion chamber volume, and then the change in the intake pipe pressure is estimated based on the change in the charging efficiency. The larger the residual amount of the burnt gas in the cylinder 5 is, namely the lower the charging efficiency is, the higher the intake pipe pressure becomes. To put it differently, the smaller the residual amount of the burnt gas in the cylinder 5 is, namely the higher the charging efficiency is, the lower the intake pipe pressure becomes.

The amount of external EGR is determined by the degree of opening of the EGR valve 39 and the pressure difference between the upstream and the downstream of the EGR valve 39 or the pressure difference between the pressure of the burnt gas and the intake pipe pressure. Therefore, the ECU 30 can compute the pressure difference based on the estimated change in the intake pipe pressure and compute the degree of opening of the EGR valve 39 based on the pressure difference and the target amount of EGR. In connection with this, the pressure of the burnt gas can be detected by a pressure sensor (not shown) provided in the EGR pipe 38.

With execution of the routine shown in FIG. 12, the degree of opening of the EGR valve 39 is adjusted in accordance with the change in the combustion chamber volume. Specific setting of the degree of opening of the EGR valve 39 cannot be uniquely determined, since it relates to the design choice that how the amount of EGR should be set in relation to operating states of the internal combustion engine 1. For example, the degree of opening of the EGR valve 39 may be set in such a way as to prevent a change in the charging efficiency involved by a change in the combustion chamber volume. In this case, when the combustion chamber volume is increased in order to decrease the compression ratio, the degree of opening of the EGR valve 19 is adjusted in the closing direction to decrease the amount of external EGR so as to suppress the decrease in the charging efficiency. When the combustion chamber volume is decreased in order to increase the compression ratio, the degree of opening of the EGR valve 39 is adjusted in the opening direction to increase the amount of external EGR so as to suppress an increase in the charging efficiency.

The above process is merely an example, and it is possible that the EGR valve may be adjusted temporarily in the opening direction even in the case the compression ratio is to be decreased. According to this embodiment, it is possible to make the actual amount of EGR close to the target amount of EGR by controlling the degree of opening of the EGR valve 39 based on the actual volume of the combustion chamber. As a result, irregularities in the air-fuel ratio involved by changing of the combustion chamber volume is inhibited, and deterioration in exhaust gas improving abilities and deterioration in gas mileage can be further reduced.

In the above-described fifth embodiment, the EGR apparatus 37 constitutes the "EGR mechanism" of the present invention. In addition, the "control unit" of the present invention is realized by execution of the routine shown in FIGS. 10 and 12 by the ECU 30.

Although embodiments of the present invention have been described in the foregoing, the present invention is not limited to the above-described embodiments, but various modifications can be made thereon without departing from the spirit and scope of the present invention. For example, the structure of the compression ratio changing mechanism used in the above-described embodiments is merely an example, and it may have a different structure so long, at least, as it is adapted to change the compression ratio by changing the combustion chamber volume.

Figure 5:
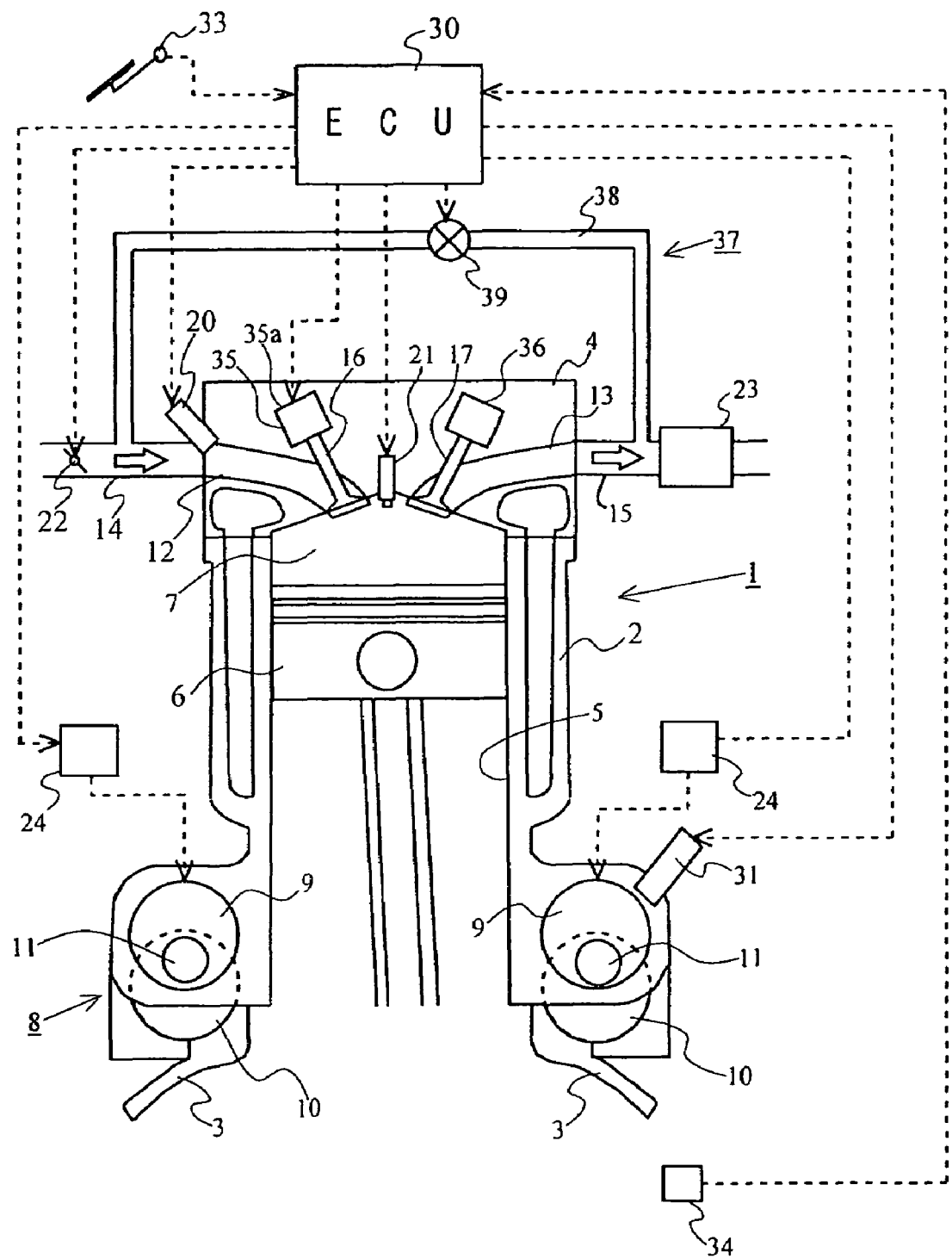
FIG. 5 schematically shows the structure of an internal combustion engine according to a first embodiment of the present invention.

The series of routines shown in FIGS. 6 and 7 executed in the second embodiment can be applied to internal combustion engines other than that having the structure shown in FIG. 5. What is required at least in order to execute this series of routines is provision of a compression ratio changing mechanism and a fuel injection valve, and therefore a variable valve actuation mechanism and an EGR apparatus maybe eliminated. The series of routines shown in FIGS. 6, 8 and 9 executed in the third embodiment and the series of routines shown in FIGS. 6, 10 and 11 executed in the fourth embodiment can also be applied to internal combustion engines other than that having the structure shown in FIG. 5. What is required at least in order to execute these series of routines is provision of a compression ratio changing mechanism and a variable valve actuation mechanism, and therefore an EGR apparatus may be eliminated. The series of routines shown in FIGS. 6, 10 and 12 executed in the fifth embodiment can be applied to internal combustion engines other than that having the structure shown in FIG. 5. What is required at least in order to execute this series of routines is provision of a compression ratio changing mechanism and an EGR apparatus, and therefore a variable valve actuation mechanism may be eliminated.

The structure of the variable valve actuation mechanism used in the second to the fifth embodiments is merely an example, and no limitations are placed on its structure. It may have a structure in which the phase of a cam shaft is varied, a structure in which cams achieving different lift amounts are switched, or a structure in which the lift amount and the operation angle are changed continuously and simultaneously. A variable valve actuation mechanism may be provided in the exhaust valve in addition to in the intake valve, or alternatively it may be provided only in the exhaust valve. For example, although in the third and fourth embodiments, the closing timing of the intake valve is controlled to adjust the in-cylinder intake air quantity, the lift amount of the intake valve may be controlled instead or additionally. Although in the fourth embodiment, the opening timing of the intake valve is controlled to adjust the amount of internal EGR, the closing timing of the exhaust valve may be controlled instead or additionally.

The series of routine shown in FIG. 12 executed in the fifth embodiment may be used in combination with the series of routine executed in the fourth embodiment. Although in the fourth embodiment, the amount of internal EGR is adjusted by the opening timing of the intake valve, it is considered that the amount of internal EGR may change after closing of the intake valve until adjustment of the in-cylinder intake air quantity. In this case, it is possible to bring the total amount of EGR closer to the target amount of EGR by controlling the amount of external EGR in such a way as to compensate the amount of internal EGR, for example by increasing the amount of external EGR when the amount of internal EGR increases.

Although the structure of the internal combustion engine shown in FIG. 5 is assumed to be a gasoline engine, the present invention may also be applied to diesel engines. However, since diesel engines intrinsically have high compression ratios as compared to gasoline engines, in controlling the compression ration by the compression ratio changing mechanism a target compression ratio under partial load is set as a reference target compression ratio, and the target compression ratio is set lower than the reference target compression ratio when it is determined that the engine load is high. This is merely an example of the target compression ratio setting, and other settings may be adopted, needless to say.

INDUSTRIAL APPLICABILITY

The present invention may be applied to any internal combustion engine in which the compression ratio can be changed by changing the combustion chamber volume, irrespective of the structure of the mechanism for changing the compression ratio.

The invention claimed is:

1. An internal combustion engine with a variable compression ratio, the internal combustion engine comprising:
an exhaust gas purifying catalyst provided in an exhaust passage;
a compression ratio changing mechanism for changing the compression ratio by changing a volume of a combustion chamber; and
a control unit for controlling a factor that influences an air-fuel ratio in such a way that in a transition period during which the compression ratio is changed, the air-fuel ratio of air-fuel mixture in a cylinder becomes substantially equal to the air-fuel ratio before and after the change of the compression ratio.

2. An internal combustion engine with a variable compression ratio according to claim 1, wherein said control unit corrects a fuel injection quantity in such a way that in a transition period during which the compression ratio is changed, the air-fuel ratio of air-fuel mixture in the cylinder becomes substantially equal to the air-fuel ratio before and after the change of the compression ratio.

3. An internal combustion engine with a variable compression ratio according to claim 2, wherein in a transition period during which the compression ratio is changed to a high compression ratio, correction to make the fuel injection quantity smaller than that in a period during which the compression ratio is kept constant is performed.

4. An internal combustion engine with a variable compression ratio according to claim 3, wherein the cylinder in which the fuel injection quantity is corrected is a cylinder that is on an intake stroke in the transition period during which the compression ratio is changed to the high compression ratio.

5. An internal combustion engine with a variable compression ratio according to claim 2, wherein in a transition period during which the compression ratio is changed to a low compression ratio, correction to make the fuel injection quantity larger than that in a period during which the compression ratio is kept constant is performed.

6. An internal combustion engine with a variable compression ratio according to claim 5, wherein the cylinder in which the fuel injection quantity is corrected is a cylinder that is on an intake stroke in the transition period during which the compression ratio is changed to a low compression ratio.

7. An internal combustion engine with a variable compression ratio according to claim 1, wherein in the transition period during which the compression ratio is changed, said control unit detects an actual volume of the combustion chamber, and controls the factor that influences the air-fuel ratio based on the actual volume of the combustion chamber thus detected.

8. An internal combustion engine with a variable compression ratio according to claim 7, wherein in the transition period during which the compression ratio is changed, said control unit controls a fuel injection quantity based on the actual volume of the combustion chamber.

9. An internal combustion engine with a variable compression ratio according to claim 7, further comprising a variable valve actuation mechanism for varying a valve opening characteristic of an intake valve and/or an exhaust valve, wherein in the transition period during which the compression ratio is changed, said control unit controls the variable valve actuation mechanism based on an actual volume of the combustion chamber.

10. An internal combustion engine with a variable compression ratio according to claim 7, further comprising an EGR mechanism for changing an amount of EGR in the internal combustion engine, wherein in the transition period during which the compression ratio is changed, said control unit controls the EGR mechanism based on an actual volume of the combustion chamber.

11. An internal combustion engine with a variable compression ratio according to claim 7, wherein the cylinder in which the factor that influences the air-fuel ratio is controlled based on the actual volume of the combustion chamber is a cylinder that is on an exhaust stroke in the transition period during which the compression ratio is changed.

12. An internal combustion engine with a variable compression ratio according to claim 8, wherein the cylinder in which the factor that influences the air-fuel ratio is controlled based on the actual volume of the combustion chamber is a cylinder that is on an exhaust stroke in the transition period during which the compression ratio is changed.

13. An internal combustion engine with a variable compression ratio according to claim 9, wherein the cylinder in which the factor that influences the air-fuel ratio is controlled based on the actual volume of the combustion chamber is a cylinder that is on an exhaust stroke in the transition period during which the compression ratio is changed.

14. An internal combustion engine with a variable compression ratio according to claim 10, wherein the cylinder in which the factor that influences the air-fuel ratio is controlled based on the actual volume of the combustion chamber is a cylinder that is on an exhaust stroke in the transition period during which the compression ratio is changed.

* * * * *